United States Patent [19]

Kakimi

[11] Patent Number: 5,389,040
[45] Date of Patent: Feb. 14, 1995

[54] DRIVING POWER TRANSMISSION SYSTEM
[75] Inventor: Kunio Kakimi, Tokyo, Japan
[73] Assignee: Sony Corporation, Tokyo, Japan
[21] Appl. No.: 120,318
[22] Filed: Sep. 13, 1993

Related U.S. Application Data

[63] Continuation of Ser. No. 728,361, Jul. 11, 1991, abandoned.

[30] Foreign Application Priority Data

Jul. 20, 1990 [JP] Japan .................. 2-77276[U]

[51] Int. Cl.$^6$ .................................................. F16D 3/52
[52] U.S. Cl. ..................................... 464/57; 242/349; 464/160
[58] Field of Search ................ 464/51, 57, 58, 60, 464/160; 242/200, 201, 356.5, 349; 267/155, 275

[56] References Cited

U.S. PATENT DOCUMENTS

| | | | |
|---|---|---|---|
| 2,616,274 | 11/1952 | Landrum | 464/57 |
| 3,146,756 | 9/1964 | Shimanckas | 464/160 X |
| 3,235,208 | 2/1966 | Root | 464/57 X |
| 3,930,380 | 1/1976 | Fogt | 464/57 |
| 4,760,751 | 8/1988 | Kasamatsu | 242/201 X |
| 4,936,524 | 6/1990 | Hüutter | 242/201 |
| 4,944,278 | 7/1990 | Woodward | 464/57 X |
| 5,064,137 | 11/1991 | Komatsu | 242/201 |

Primary Examiner—Daniel P. Stodola
Assistant Examiner—Eileen A. Dunn
Attorney, Agent, or Firm—Jay H. Maioli

[57] ABSTRACT

A driving power transmission system has a rotary base supported for rotation as one with a driving shaft rotated in forward and reverse directions at controlled rotational velocities and a driving power transmitting member rotatably supported by the driving shaft. The rotary base and driving power transmitting member are interconnected by an elastic connecting member. A rotational position control member is provided for controlling the rotational position of the driving power transmitting member with respect to the rotary base. During constant speed rotation, the driving power transmission system transmits the rotational driving power of the driving shaft through the elastic connecting member to the driving power transmitting member to prevent torque ripples produced in the driving shaft from being transmitted to a driven unit. During high speed rotation, the driving power transmitting member is made as one with the rotary base to enable the driven unit to be rotationally driven in a stable state at a higher speed of rotation.

3 Claims, 4 Drawing Sheets

DRIVING POWER TRANSMISSION SYSTEM

This is a continuation of application Ser. No. 07/728,361, filed Jul. 11, 1991, now abandoned.

BACKGROUND OF THE INVENTION

1. Field of the Invention

This invention relates to a driving power transmission system for transmitting the driving power of a driving electric motor, such as a reel motor, adapted for rotationally driving a rotationally driven unit, such as a reel block unit of a tape recorder, to the rotationally driven unit.

2. Description of the Prior Art

There has previously been employed a reel block driving unit in a tape recorder in which a driving electric motor used exclusively for driving a pair of reel blocks is provided between the reel blocks and in which these reel blocks are selectively driven in rotation by the driving electric motor as a function of the selected magnetic tape running mode.

The reel block driving unit is provided with a driving power transmission switching system in which a lever having a pivot on a driving shaft of the driving motor is provided and an idler gear selectively meshing with rotary gears of the reel blocks is provided on the lever. The driving power transmission switching system is so constructed that the aforementioned lever is rotated by means of a friction unit in dependence upon whether the driving motor is rotated in forward or in reverse, with the idler gear on the lever meshing with one of said rotary gears for selectively driving one or the other of said reel blocks in rotation.

The above described reel block driving device is adapted for directly transmitting the driving power of the driving motor to the rotary gears of the reel blocks by means of the driving power transmission gears, such as idler gear. The result is that disturbance factors disturbing the rotational driving, such as torque ripples proper to the driving motor, are directly transmitted to the rotary gears of the reel blocks. If torque ripples are transmitted to the rotary gears of the reel blocks, stable rotational driving of the reel blocks cannot be achieved to affect the tension of the magnetic tape to be wound on tape reels engaged with the reel blocks to produce wow and flutter in the running tape to render it impossible to obtain satisfactory recording/reproducing characteristics.

Thus the above described reel block driving apparatus is designed to realize a high velocity driving of the reel blocks by taking advantage of the rotational driving force of the driving motor only during the fast feed or rewind mode operations not affecting the recording/reproducing characteristics. On the other hand, when running the magnetic tape at a constant, such as during the recording/reproduction, the reel blocks are driven without resorting to the driving power of the reel block driving motor, the driving power of which is directly transmitted to the reel blocks by means of idler gears or the like. For example, a driving motor provided for driving a capstan shaft in rotation in addition to the reel block driving motor and the reel blocks are interconnected by a belt connecting system, such as a rubber belt, by means of which torque ripples of the driving motor maybe absorbed to realize satisfactory rotational driving of the reel blocks.

In the above described conventional reel block driving apparatus, the drive power transmission changeover system for transmitting the rotational driving power of the reel block driving motor to a selected one of the reel blocks as a function of the rotational direction may be simplified in structure to simplify the apparatus to contribute to size reduction of the tape recorder.

However, in the above described conventional reel block driving apparatus, torque ripples of the driving motor are directly transmitted to the rotating reel blocks to produce wow and flutter in the tape being wound by the reel blocks. For this reason, the reel block driving apparatus cannot be used during the recording-/reproducing mode in which the tape is run at a constant velocity, so that it becomes necessary to provide a separate driving system for the reel blocks, which renders it impossible to simplify the system satisfactorily.

OBJECTS AND SUMMARY OF THE INVENTION

It is therefore a principal object of the present invention to provide a driving power transmission system in which torque ripples proper to the driving motor may be removed by a simplified system.

It is another object of the present invention to provide a driving power transmission system which, on being applied to a reel block driving apparatus for a tape recorder, may be utilized not only during fast forward and rewind operations but during constant velocity running for recording and/or reproduction.

The present invention provides a driving power transmission system comprising a driving shaft rotated in forward or in reverse at controlled rotational velocities, a rotary base supported by the driving shaft for rotation as one with the driving shaft, a driving power transmission member having a driving power transmitting part and rotatably supported by the driving shaft, an elastic connecting member interconnecting the rotary base and the driving power transmitting member, and a rotational position prescribing member for controlling the rotational position of the driving power transmitting member with respect to the rotary base.

With the above described system of the present invention, when the driving shaft, which may be driven in forward or in reverse at controlled velocities, is driven at a constant velocity, the rotational driving power of the driving motor is transmitted by means of the elastic connecting member to the driving power transmitting member rotatably supported by the driving shaft to effect rotational driving of the driving power transmitting member. In case fluctuations occur at the driving shaft side in the rotational driving power due to torque ripples in the driving motor, the elastic connecting member is elastically deformed to absorb the fluctuations in the rotational driving power. When the driving shaft is rotated at a higher velocity, a rotational power in excess of the spring force of the elastic connecting member is applied to the rotary base to cause significant elastic deformation of the elastic connecting member to cause the rotation of the driving power transmitting member as one with the rotary base at the rotational position prescribed by the rotational position prescribing member.

DETAILED DESCRIPTION OF THE PREFERRED EMBODIMENT

By referring to the accompanying drawings, a preferred embodiment of the present invention is explained in detail.

Figure 1:
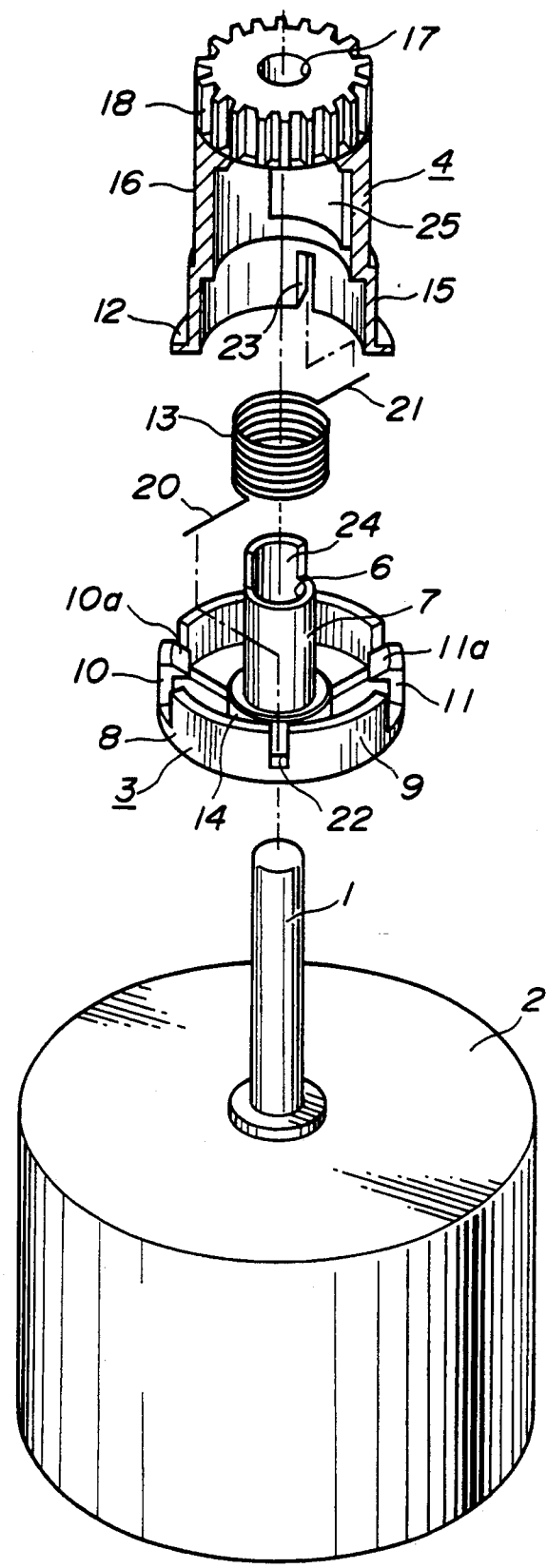
FIG. 1 is an exploded perspective view showing a driving power transmission system according to the present invention.

FIG. 1 shows a driving power transmission system of the present invention provided with a driving shaft (drive shaft) 1 which may be driven in both the forward and reverse directions at a controlled velocity.

Although the driving shaft 1 is constituted by an output shaft of a driving electric motor 2 which is rotationally driven in both the forward and reverse directions at a controlled velocity, the driving shaft 1 may also be connected to the output shaft by means of a connection mechanism adapted for directly taking out a driving power from the output shaft.

On the driving shaft 1 are mounted a rotary base 3 secured to the shaft 1 so as to be rotated in unison therewith and a driving power transmission member 4 supported by the driving shaft 1 so as to be rotated freely with respect to the shaft 1.

Figure 2:
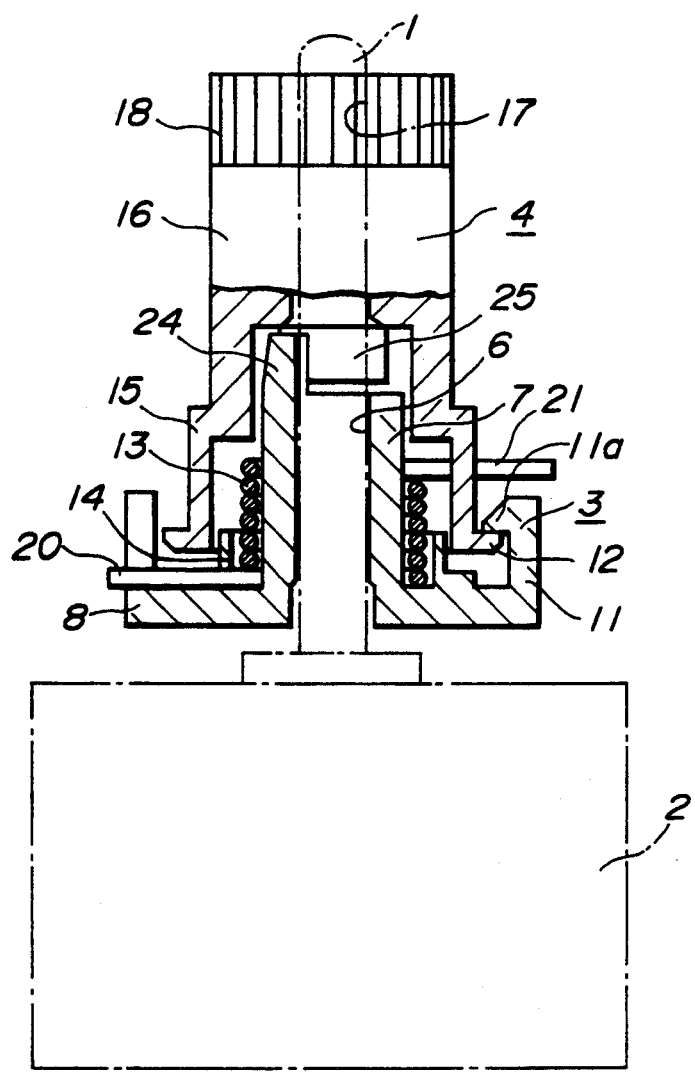
FIG. 2 is a cross-sectional side elevational view showing the driving power transmission system in the assembled position.

A driving shaft receiving tube 7 having a central bore 6 of a size to snugly receive the driving shaft 1 is secured to the rotary base 3. With the driving shaft 1 snugly received within the shaft receiving tube 7 of the rotary base 3, as shown in FIG. 2, the rotary base 3 may be secured to the proximal end of the driving shaft 1 so as to be rotated in unison with the driving shaft 1. The proximal end of the rotary base 3 is formed with a disc-shaped supporting plate 8 adapted for supporting a driving power transmission member 4 rotatably supported by the driving shaft 1. An upright peripheral wall 9 is formed on the outer periphery of the supporting plate 8. The periphery of the wall 9 is partially cut to form segmented retention pieces 10, 11 which may be flexed radially of the supporting plate 8. These retention pieces 10 and 11 are formed with end pawls 10a, 11a, respectively, which are engaged with an annular retention flange 12 formed on the outer periphery of the proximal end of the driving power transmission member 4 rotatably supported by the driving shaft 1 to prevent the driving power transmission member 4 from being disengaged and detached axially from the driving shaft 1. A positioning piece 14 for positioning one end of a torsion coil spring 13, which is a flexible connecting member interconnecting the rotary base 3 and the driving power transmission unit 4 and transmitting the rotary driving power of the driving shaft 1 to the driving power transmission member 4, is upstandingly formed on the upper surface of the supporting plate 8 coaxially with the shaft receiving tube 7.

The driving power transmission member 4 is formed, on the proximal end thereof provided with the retention flange 12, with a spring retaining larger diameter section 15 adapted for retaining the other end of the torsion coil spring 13. Contiguous with the upper end of the spring retaining larger diameter section 15 is a tubular section 16 having a diameter less than the diameter of the section 15 and adapted for receiving the shaft receiving tube 7 of the rotary base 3. The tubular section 16 has a central bore 17 through which the driving shaft 1 is passed. The central bore 17 is selected to be slightly larger in diameter than the outer diameter of the driving shaft 1. A gear 18 for transmitting the rotational driving power of the driving shaft 1 to the driven unit is formed on the outer periphery of an upper end extremity of the tubular section 16. When the driving power transmission system is employed in conjunction with a reel block device, the gear 18 meshes with an idler gear provided on a lever of a reel base driving device not shown.

The driving power transmission member 4 is placed on and supported by the rotary base 3, with the driving shaft 1 being passed through the bore 17 in the tubular section 16. The driving power transmission member 4 is pressed at this time onto the rotary base 3 to cause the annular flange 12 on the proximal side of the member 4 to be retained by the retention pieces 10 and 11, as shown in FIG. 2, to prevent the member 4 from becoming detached from the driving shaft 1.

Figure 3:
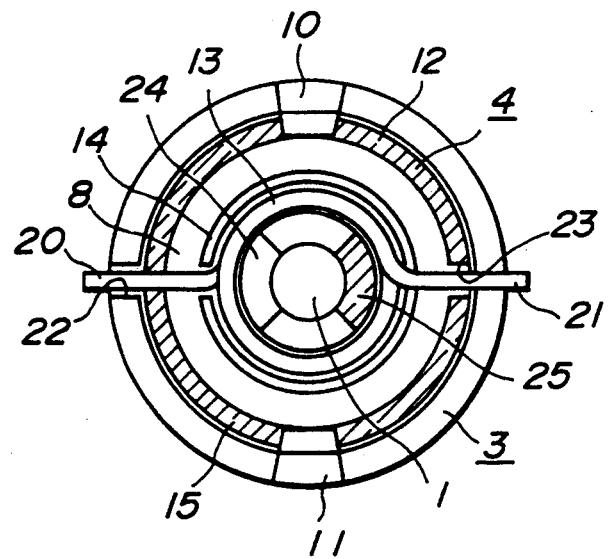
FIG. 3 is a transverse cross-sectional view showing the system of FIG. 1 in the standstill position.

The torsion coil spring 13, functioning as the flexible connecting member interconnecting the rotary base 3 and the driving power transmission member 4, is formed with a pair of terminal sections 20, 21 at the lower and upper ends, respectively, for extending in the opposite directions, so as to be engaged with the rotary base 3 and the driving power transmission member 4, respectively. As shown in FIG. 2, the torsion coil spring 13 is fitted over the shaft receiving tube 7 of the rotary base 3, with the lower end of the spring engaging with the inner periphery of the positioning piece 14 provided on the rotary base 3 and with the upper end of the spring engaging with the spring retraining section 15. The torsion coil spring 13 is mounted, as shown in FIG. 3; with the lower terminal section 20 engaging in an axially extending engaging groove 22 formed in the upright peripheral wall 9 of the rotary base 3 and witch the upper terminal section 21 engaging in an axially extending engaging groove 23 formed in the spring retraining section 15 of the driving power transmitting member 4. By having the terminal ends 20, 21 engaging with the rotary base 3 and the driving power transmission member 4 in this manner, the torsion coil spring 13 interconnects the rotary base 3 and the driving power transmission member 4 for transmitting the rotational driving power from the rotary base 3 to the driving power transmitting member 4.

Meanwhile, the force of the torsion coil spring 13 is selected to be approximately equal to a rotational driving power developed by the driving shaft 1 when rotated at a fixed velocity.

An abutment member 24 and an abutment member retention lug 25 are provided on the side of the rotary base 3 and on the side of the driving power transmission member 4, respectively. The abutment member 24 and the abutment retention lug 25 make up a rotational position prescribing unit for prescribing the rotational position of the driving power transmitting member 4 with respect to rotary base 3 when the driving shaft 1 is rotated at a higher velocity so that a rotational power in excess of the spring force of the torsion coil spring 13 is applied to the rotary base 3 to cause the torsion coil spring 13 to be elastically deflected to rotate the transmitting member 4 under a rotational force acting in the opposite direction to the direction of rotation of the rotary base 3. As shown in FIG. 1, the abutment member 24 is mounted upright on the upper end surface of the shaft receiving tube 7 of the rotary base 3, while the retention lug 25 is provided on the inner periphery of the tubular section 16 of the driving power transmitting member 4. In the standstill state, the abutment member 24 and the retention lug 25 are at the positions spaced apart from and out of contact with each other so that, under the constant velocity rotation of the driving shaft 1, the driving power of the driving shaft 1 will be transmitted to the driving power transmitting member 4 solely by means of the torsion coil spring 13. Thus, under the state of standstill, the abutment member 24 and the abutment member retention lug 25 are mounted diametrally opposite to each other, as shown in FIG. 3.

The upper end face of the abutment member 24 represents the height prescribing surface for prescribing the position of the mounting height of the driving power transmitting member 4 with respect to the driving shaft 1.

Figure 4:
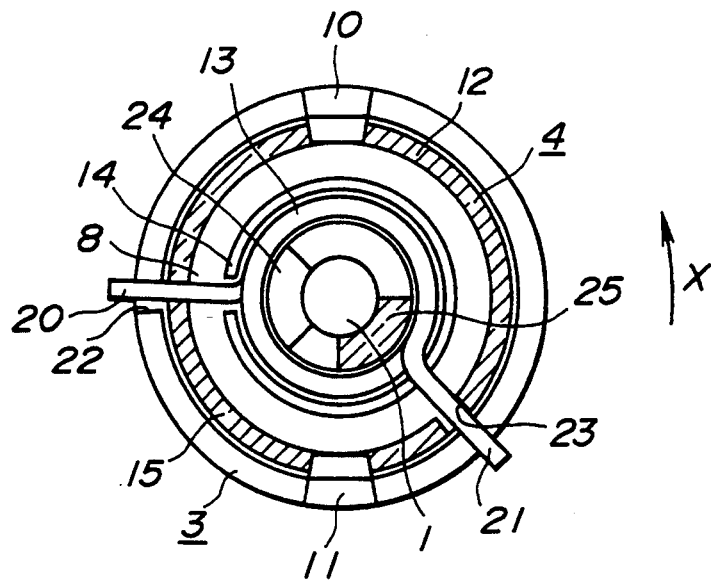
FIG. 4 is a transverse cross-sectional view similar to FIG. 3 and showing the state in which the driving shaft is rotationally driven in forward at a constant velocity.

With the above described driving power transmission system, the driving shaft 1 starts its rotation at a constant velocity in the direction shown by an arrow X in FIG. 4, with the gear 18 of the driving power transmitting member 4 meshing with an idler gear provided on the lever of the reel block driving unit of a tape recorder. When the shaft 1 reaches the state of a steady state rotation, a thrusting force acting in the rotational driving direction of the driving shaft 1 is applied from the driving power transmitting member 4 to the torsion coil spring 13 which is fitted over the shaft receiving tube 7 and which is interposed between the rotary base 3 and the driving power transmission member 4. Thus the torsion coil spring 13 is flexurally biased in the same direction. The torsion coil spring 13 interconnects the rotary base 3 and the driving power transmitting member 4 by virtue of its force of elastic restoration to cause the rotation of the driving power transmitting member 4 so as to follow the rotary base 3 which is driven in rotation in unison with the driving shaft 1. Since the torsion coil spring 13 has the spring force which is approximately in equilibrium with the driving power of the driving electric motor adapted for driving the driving shaft 1 into rotation, the driving power from the rotary base is transmitted to the driving power transmitting member 4 only by means of the torsion coil spring 13 without the abutment member 24 engaging with the abutment member retention lug 25. Therefore, should fluctuations be produced in the rotational driving power due to, for example, torque ripples in the driving electric motor rotationally driving the driving shaft 1, the amount of the elastic deflection of the torsion coil spring 13 is changed to absorb any fluctuations in the rotational driving power caused by the torque ripples or the like to permit the driving power transmitting member 4 to be rotationally driven at a constant rotational driving power. The reel block connected to the driving power transmitting member 4 by means of the idler gear of the like is driven in rotation in a stabilized state under a constant rotational driving power to permit stable running of the magnetic tape without affecting the tension of the magnetic tape being taken up by means of the reel block.

Figure 5:
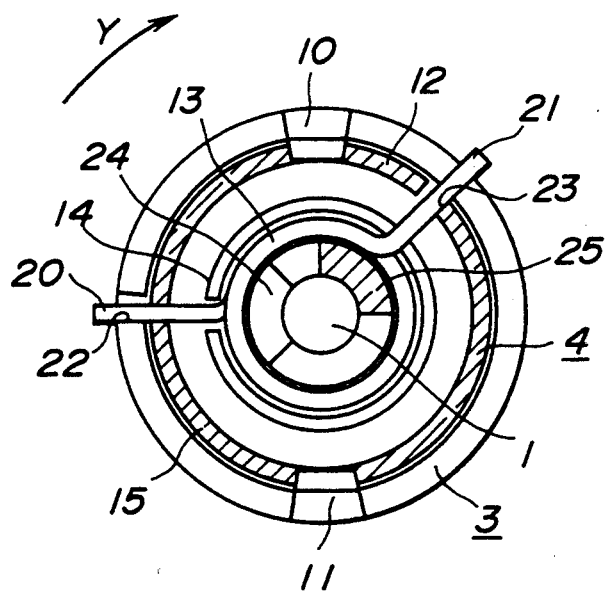
FIG. 5 is a transverse cross-sectional view similar to FIG. 3 and showing the state in which the driving shaft is rotationally driven in reverse at a constant velocity.

On the other hand, if the driving shaft 1 is rotationally driven at a constant velocity in the direction shown by an arrow Y in FIG. 5, that is, in the direction opposite to that shown in FIG. 4, the torsion coil spring 13 is elastically deflected in the same direction as the rotational driving direction of the driving shaft 1, as shown in FIG. 5. Under the force of the elastic deflection, the torsion coil spring 13 interconnects the rotary base 3 and the driving power transmitting member 4 to cause the rotation of the driving power transmitting member 4 in such a manner as to follow the rotation of the rotary base 3 which is driven in rotation in unison with the driving shaft 1. If torque ripple or the like is produced in the driving motor rotationally driving the driving shaft 1 to cause fluctuations in the rotational driving power, the amount of elastic deformation of the torsion coil spring 13 is changed to absorb fluctuations in the rotational driving power caused by torque ripples or the like to permit the driving power transmitting member 4 to be rotationally driven under a constant rotational driving power. Thus the present driving power transmission system is able to absorb torque ripples or the like otherwise causing fluctuations in the rotational driving power possessed by the driving motor in both the forward and reverse constant-speed rotational driving states of the driving shaft 1.

Figure 6:
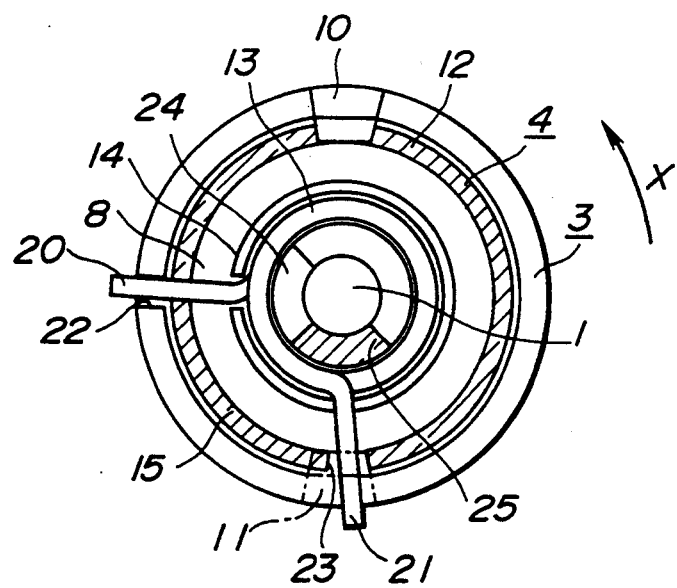
FIG. 6 is a transverse cross-sectional view similar to FIG. 3 and showing the state in which the driving shaft is rotationally driven in forward at a higher velocity.

If the driving shaft 1 is driven in a high-speed rotation in the same direction as in FIG. 4, that is, in a direction shown by an arrow X in FIG. 6, a thrusting force in excess of the spring force of the torsion coil spring 13 is exerted on the torsion coil spring 13 from the driving power transmitting member 4 to cause a significant elastic deflection of the torsion coil spring 13 in the rotational driving direction of the driving shaft 1. As a result, the abutment member retention lug 25 provided on the driving power transmitting member 4 abuts on the abutment piece 24 provided on the rotary base 3, as shown in FIG. 6, to control the rotational position of the driving power transmitting member 4 with respect to the rotary base 3, with the driving power transmitting member 4 being rotationally driven at a higher velocity in the direction shown by an arrow X in FIG. 6 as one with the rotary base 3.

Figure 7:
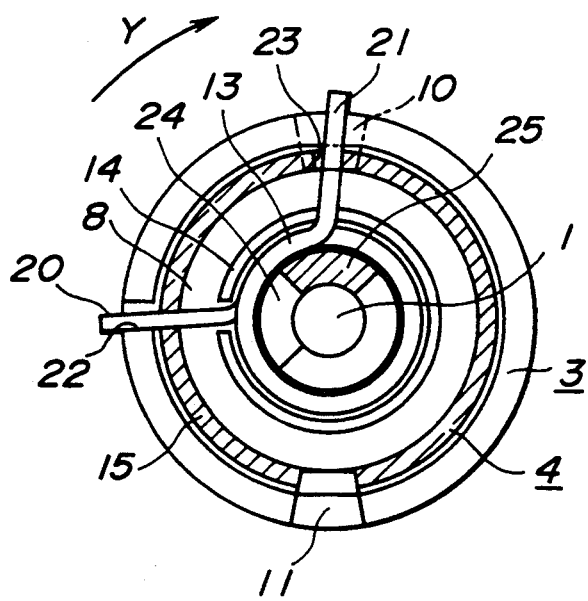
FIG. 7 is a transverse cross-sectional view similar to FIG. 3 and showing the state in which the driving shaft is rotationally driven in reverse at a higher velocity.

When the driving shaft 1 is rotationally driven at a higher velocity in the same direction as that shown in FIG. 5 or in the direction shown by an arrow Y in FIG. 7, the torsion coil spring 13 undergoes significant elastic deflection in the direction opposite to that shown in FIG. 6 as that, as shown in FIG. 7, the abutment member retention lug 25 provided on the driving power transmitting member 4 abuts on the abutment member 24 provided on the rotary base 3, and hence the driving power transmitting member 4 is driven in a high-speed rotation as one with the rotary base 3 in the direction shown by an arrow Y in FIG. 7.

What is claimed is:

1. A driving power transmission system for transmitting rotational driving power to a tape take-up reel block in a tape recorder, the system comprising:
    a drive shaft rotated at either a first rotational velocity in a forward direction or at a second rotational velocity higher than said first rotational velocity in either said forward direction or a reverse direction;
    a rotary base supported by said drive shaft for rotation in unison therewith;

a driving power transmitting member supported by said rotary base and having a tubular shape including a driving power transmitting gear at a distal end thereof for engagement with the tape take-up reel block, said driving power transmitting member being supported by said rotary base for rotation independently of said drive shaft;

an elastic connecting member provided on said rotary base, said elastic connecting member comprising a torsion coil spring having two terminal ends extending radially at positions diametrically opposite to each other, wherein a first terminal end engages said rotary base and a second terminal end engages said driving power transmitting member and said elastic connecting member elastically interconnects said rotary base and said driving power transmitting member in either direction of rotation of said drive shaft;

rotational position control means including an abutment member arranged on an upper surface of said rotary base and an abutment member retention lug arranged on an inner surface of said driving power transmitting member for controlling a rotational position of said driving power transmitting member with respect to said rotary base;

a rotational driving power of said drive shaft being transmitted to said driving power transmitting member through said rotary base and said elastic connecting member during rotation at said first rotational velocity; and said rotational driving power of said drive shaft being transmitted to said driving power transmitting member by engagement of said abutment member attached to said rotary base with said abutment member retention lug attached to said driving power transmitting member during rotation at said second rotational velocity.

2. The driving power transmitting system according to claim 1 wherein said rotary base is formed with a plurality of retention pieces for preventing said driving power transmitting member from being disengaged axially of said drive shaft.

3. The driving power transmission system according to claim 1 wherein said drive shaft comprises a rotary shaft of an electric motor.

* * * * *